United States Patent [19]

Muilwijk

[11] 3,818,344

[45] June 18, 1974

[54] SYSTEM FOR TRANSMITTING INFORMATION PULSES

[75] Inventor: Dirk Muilwijk, Hilversum, Netherlands

[73] Assignee: U.S. Philips Corporation, New York, N.Y.

[22] Filed: Mar. 15, 1972

[21] Appl. No.: 234,916

[30] Foreign Application Priority Data

Mar. 25, 1971 Netherlands ....................... 7104072

[52] U.S. Cl. .................. 325/30, 178/66 R, 325/45, 325/163

[51] Int. Cl. ............................................ H04l 27/10

[58] Field of Search ........ 178/66 R, 68; 325/30, 45, 325/145, 163, 320

[56] References Cited

UNITED STATES PATENTS

| | | | |
|---|---|---|---|
| 3,144,608 | 8/1964 | Warring | 325/30 |
| 3,525,945 | 8/1970 | Puente | 178/66 R X |
| 3,387,213 | 6/1968 | Lender | 178/66 R X |
| 3,343,093 | 9/1967 | Van Gerwen | 178/66 R X |
| 3,305,634 | 2/1967 | Rusick | 325/163 X |
| 3,260,994 | 7/1966 | Sturdy | 325/30 UX |

*Primary Examiner*—Charles E. Atkinson
*Assistant Examiner*—Jerry Smith
*Attorney, Agent, or Firm*—Frank R. Trifari

[57] ABSTRACT

A system for transmitting information pulses comprising a transmitter and a reciver. The transmitter comprising a carrier generator, a modular which is coupled thereto and a clock pulse generator. The information pulses are synchronized with the clock pulses, which also determine a fixed phase relationship between the carrier signal and the clock pulses. The carrier signal is phase-shifted modulated by the information signal. The receiver comprises a carrier regenerator and a demodulator which is connected thereto and which receives the phase-shift modulated carrier signal. The output of the demodulator is connected to a clock pulse generator for deriving ambiguous clock pulses synchronized with the clock pulses of the transmitter by detecting zero passages of the demodulated signal. The output of the clock pulse generator is connected to a phase comparison device which is feedback to compensate for differences in the predetermined phase relationship between the clock pulses and the carrier signals.

4 Claims, 3 Drawing Figures

SYSTEM FOR TRANSMITTING INFORMATION PULSES

The invention relates to a system for transmitting information pulses, comprising a transmitter and a receiver, the transmitter comprising a clock pulse generator for making the instants of appearance of the information pulses coincide with a series of equidistant clock pulses generated by the clock pulse generator, a carrier generator and a modulator which is connected thereto for the phase-shift modulation by the information pulses of a carrier signal generated by the carrier generator, the receiver comprising a carrier regenerator and a demodulator which is connected thereto and which serves for synchronous demodulation of the carrier signal by means of a carrier signal regenerated by the regenerator, and a clock pulse regenerator, connected to the demodulator, for generating clock pulses from the zero passages of the demodulated signal.

Systems of this kind are used for transmitting messages.

In systems of this kind a pulse is characterized by a given phase of the carrier signal. Consequently, unambiguous recognition of the phase of the carrier signal is required at the receiver side. Systems are known, for example, from the book "Date Transmission" by W.R. Bennet and J.R. Davey, in which the regenerated carrier signal has a number of possible phase positions, the said number of positions being uniformly distributed over 360°.

It is known to transmit an additional pilot oscillation with the signal to be transmitted, unambiguous determination of the phase of the carrier signal being possible in the receiver by means of the said pilot oscillation. However, this pilot oscillation requires additional band width while, if use is made of a pilot channel which is situated outside the transmission band, the phase of the pilot oscillation has to be separately equalized.

Also known is the use of change-of-state modulation for obtaining a zero passage in the modulated carrier signal each time a pulse appears in the information signal to be transmitted. The phase of the carrier signal is unambiguously determined in the receiver on the basis of these zero passages. This change-of-state modulation has the drawback that the signal distortion incurred on the transmission path is doubled by the change-of-state modulation.

The invention has for its object to provide a system of the kind set forth in which the phase of the regenerated carrier signal can be readily and unambiguously determined, while optimum use is made of the available transmission band for the transmission of the information signal.

To this end, the device according to the invention is characterized in that the clock pulse generator in the transmitter is connected to the carrier generator for adjusting a given phase relationship between the clock pulses and the carrier signal, the receiver comprising a phase-comparison unit, one input of which is connected to the carrier regenerator, another input being connected to the clock pulse regenerator, the carrier regenerator being provided with a phase-control input which is connected to the output of the phase-comparison unit for changing the phase of the regenerated carrier signal such that the phase relationship of the signals applied to the inputs of the phase-comparison unit is the same as the given phase relationship existing between the clock pulses and the carrier signal in the transmitter.

It is to be noted that a system is known in which a carrier signal is synchronized in the transmitter with a series of equidistant clock pulses. In this system a non-modulated carrier signal is transmitted prior to the transmission of a series of information pulses, a carrier regenerator being synchronized at the proper phase with the non-modulated carrier signal in the receiver.

The invention will now be described in detail with reference to the Figures, corresponding parts being denoted by the same reference numerals.

Figure 1:
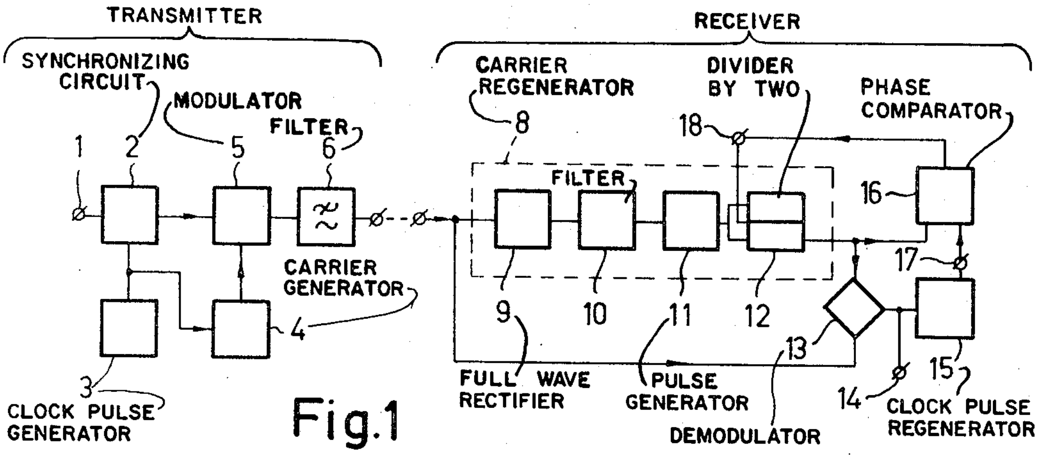
FIG. 1 shows an embodiment of a portion of a system for transmitting information pulses according to the invention.

The system for transmitting information pulses shown in FIG. 1 comprises a transmitter (1 to 6) which forms part of a transmitting station, and a receiver (8 to 18) which forms part of a receiving station.

Figure 3:
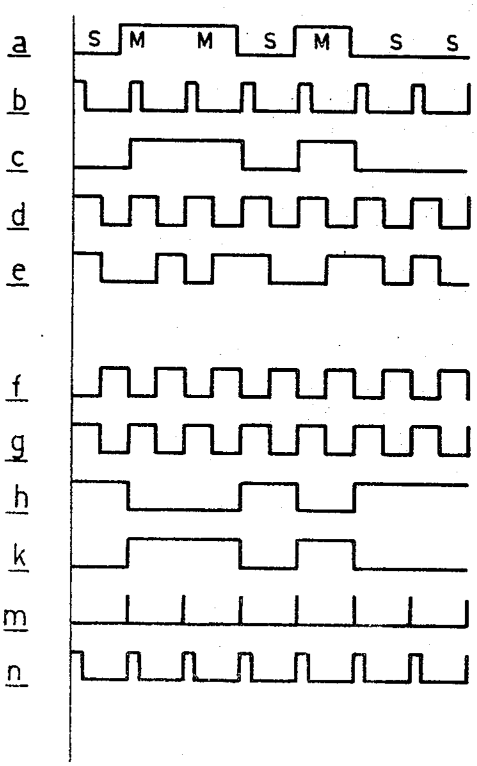
FIG. 3 shows some waveforms which may occur in the systems shown in FIGS. 1 and 2.

The transmitter comprises an input terminal 1 to which information pulses to be transmitted, originating from a message source, for example, a teleprinter, are applied. These information pulses are shown in FIG. 3*a*, an active element being denoted by M and a rest element by S. The telegraphic transmission speed of the information pulses amounts to 2,000 Baud in this case. The information pulses applied to the input terminal 1 are applied to the input of a synchronizing circuit 2, another input thereof receiving a series of equidistant clock pulses which originates from a clock pulse generator 3. This series is shown in FIG. 3*b*. The synchronizing circuit ensures that the instants of occurrence of the information pulses coincide with those of the clock pulses (see FIG. 3c), the presence or absence of an information pulse at a given clock instant being dependent of a message to be transmitted by the information pulses. The transmitter is provided with a carrier generator 4 and a modulator 5 which is connected thereto. The carrier signal generated by the carrier generator 4 is chosen to be squarewave in this example, but is not restricted thereto. This carrier signal is phase-change modulated in the modulator 5 by the synchronized information signal, the number of different phase positions of the modulated carrier signal corresponding to the number of different code groups which can appear in the information signal. For binary encoded information signals, this number of code groups amounts to $2^N$ ($N=1,2,\ldots$). In this embodiment an information signal is chosen for which $N=1$. The phase-change modulation of the squarewave carrier signal by this information signal implies that, for example, an information pulse reverses the phase of the carrier signal, the carrier signal retaining its original phase if no information pulse is present.

This phase-change modulated carrier signal is applied to a filter 6 so as to limit the band width and, using means not shown, to the receiver where it is recovered.

Due to noise and jitter, shifts occur in the instants of occurrence of the periods of the modulated carrier signal on the transmission path. To enable synchronous demodulation of this signal, the receiver comprises a carrier regenerator 8 and a demodulator 13 which is connected thereto. The carrier regenerator 8 comprises a full-wave rectifier 9, a filter 10, a pulse generator 11 and a divide-by-two circuit 12. The phase-change modulated signal is rectified by the full-wave rectifier 9, thus producing a signal containing a signal component having double the frequency of the square-wave carrier signal. This signal component is allowed to pass by the filter 10, tuned to twice the value of the repetition frequency of the square-wave carrier signal, and is applied to the pulse generator 11. This generator supplies a pulse at each instant that the signal applied to the input passes through zero in the positive direction. These pulses are applied to the bistable element which is connected as a divide-by-two circuit, each time the state of the bistable element 12 thus being changed. The regenerated squarewave carrier signal is derived from the output of this divide-by-two circuit and is applied to the demodulator 13.

The phase-change modulated carrier signal is applied to an other input of the demodulator 13, the said signal being demodulated by means of the regenerated sqaure-wave carrier signal. The demodulated signal can be derived from the output 14 for further information processing. The receiver comprises a clock pulse regenerator 15, connected to the demodulator 13, for deriving clock pulses from the zero passages of the demodulated signal.

As already described, the regenerated square-wave carrier signal is obtained by division from a signal whose repetition frequency is twice as high as that of the carrier signal.

As a result of this division, the regenerated square-wave carrier signal has a phase which is shifted 0° or 180° with respect to the squarewave modulated carrier signal. This has the drawback that either the information signal or the inverted information signal is obtained after demodulation.

According to the invention, in order to eliminate the two possible phase positions of the regenerated carrier signal, the clock pulse generator 3 in the transmitter is connected to the carrier generator 4 so as to adjust a given phase relationship between the clock pulses and the carrier signal, as is shown in FIG. 1. To this end, the receiver comprises a phase-comparison unit 16, one input of which is connected to the carrier regenerator 8, another input being connected to the clock pulse regenerator 15. Furthermore, the carrier regenerator 8 is provided with a phase-control input 18 which is connected to the output of the phase-comparison unit 16 so as to change the phase of the regenerated carrier signal such that the phase relationship of the signals applied to the inputs of the phase-comparison unit is the same as the given phase relationship existing between the clock pulses and the carrier signal in the transmitter.

Under the control of the clock pulses the carrier generator 4 in the transmitter, connected to the clock pulse generator 3, generates a squarewave carrier signal, the frequency of which is equal to or amounts to a multiple of the clock pulse repetition frequency. In the embodiment shown in FIG. 1, the carrier signal frequency is chosen to be equal to the clock pulse repetition frequency for the sake of simplicity. The phase relationship between this carrier signal, shown in FIG. 3*d*, and the clock pulses is chosen to be such that the leading edges of the squarewave signals of the carrier signal coincide with the appearance of the clock pulses. A fixed phase relationship is thus obtained between this carrier signal (FIG. 3*d*) and the clock pulse signal (FIG. 3*b*). As already described, this carrier signal is phase-change modulated by the synchronized information pulses, and the modulated carrier signal thus obtained (FIG. 3*e*) is transmitted, via filter 6, to the receiver where it is applied to the carrier regenerator 8 and the demodulator 13. The carrier signal regenerated by the carrier regenerator 8 has two possible phase positions which are denoted by the signals of FIG. *3f* and FIG. 3*g*, respectively. The information signal recovered in the demodulator by means of the regenerated carrier signal shown in FIG. *3f*, is shown in FIG. 3*h*, the information signal recovered by means of the regenerated carrier signal shown in FIG. 3*g* being shown in FIG. 3*k*.

The zero passages of these mutually inverse signals occur at the same instants. These instants correspond to the instants at which clock pulses appear, as was realized on the transmission side. Consequently, a clock signal of the proper phase can be derived from these zero passages which may have been shifted with respect to each other due to noise and jitter.

Figure 2:
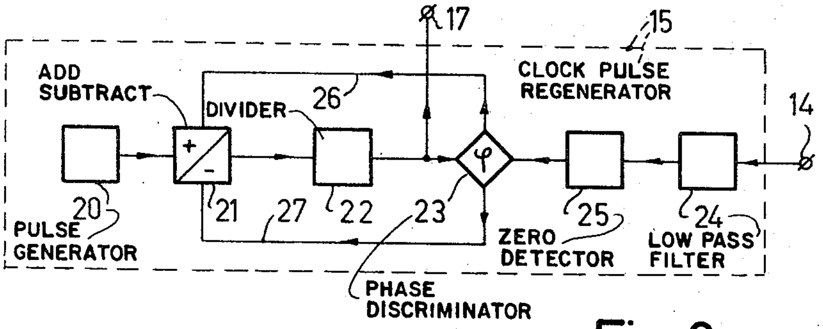
FIG. 2 shows a detail of the system shown in FIG. 1.

To this end, the clock pulse regenerator 15 is connected to the output of the demodulator 13. The clock pulse regenerator 15 is separately shown in FIG. 2.

This clock pulse regenerator 15 comprises a pulse generator 20 which generates a pulse series having, for example, a pulse repetition frequency of 50 kHz. This pulse generator is connected to an input of a phase discriminator 23 via an add-subtract circuit 21 and a divider 22 which divides the pulse series, for example, by 21. Connected to another input of the phase discriminator 23 is the input terminal 14, via a low-pass filter 24 and a zero-detector 25. The signal applied to the input terminal 14, shown in FIG. 3*h* or 3*k*, has at the most 2,000 zero passages per second due to the 2,000-Baud telegraphic transmission speed of the information pulses which was chosen by way of example. The cut-off frequency of the low-pass filter amounts to approximately 1.5 kHz. A clock pulse synchronizing signal is derived from the output signal of the low-pass filter by the zero detector 25, the said clock pulse synchronizing signal being shown in FIG. 3*m*. At the instant of appearance of the synchronizing signal (i.e. of a zero passage), the phase discriminator establishes whether the clock signal supplied by the divider 22 is positive or negative.

If the clock signal is positive, a correction signal is applied, via a conductor 27, to the add-subtract circuit 21 which suppresses one pulse of the 50 kHz signal in reaction thereto. If the clock signal is negative, a correction signal is applied, via a conductor 26, to the add-subtract circuit 21 which adds one pulse to the 50 kHz signal in reaction thereto.

As a result, the instant of appearance of the leading edge of the clock signal supplied by the divider is adjusted to the mean instant of appearance of the synchronizing signals. In this way a clock signal of the proper phase is obtained, shown in FIG. 3*n*, which follows the mean value of the shift of the zero passages of the signals shown in the FIGS. 3*h* and 3*k*, so that noise and jitter occurring on the transmission path are compensated for. This clock signal of the proper phase is available on the output 17 of the clock pulse regenerator 15.

Because a fixed phase relationship is introduced between the clock pulses and the carrier signal in the transmitter, the phase of the regenerated carrier signal can be unambiguously determined by means of the regenerated clock signal of the proper phase. To this end, the clock signal of the proper phase, originating from output 17, is applied to an input of the phase-comparison unit 16, the regenerated carrier signal (shown in FIG. *3f* or FIG. *3g*) supplied by the carrier regenerator 8 being applied to another input of this comparison unit.

If the signals applied to the phase-comparison unit 16 (the signals shown in FIGS. *3g* and *3n*) are in phase with each other, no output signal is supplied. If the signals supplied to the phase-comparison unit 16 are in phase opposition (the signals shown in FIGS. *3f* and *3n*), the phase-comparison unit supplies a pulse on the output. This output is connected to the phase-control input 18 of the carrier regenerator 8. This phase-control input is formed by the trigger input of a bistable element forming the divide-by-two circuit 12. The pulse supplied by the comparison unit 16 changes the state of the divide-by-two circuit 12, so that the output signal of the carrier regenerator 8 changes from the signal shown in FIG. *3f* to the signal shown in FIG. *3g*. The information pulses formed in the demodulator 13 by means of this regenerated carrier, are shown in FIG. *3k* and are identical to the original synchronized information pulses in the transmitter shown in FIG. *3c*.

I claim:

1. A system for transmitting information pulses comprising a transmitter and a receiver, said transmitter comprising signal input means for receiving said information pulses, generating means for producing a series of equidistant clock pulses, means coupling said input and clock pulse generating means to synchronize said information pulses with said clock pulses, means coupled between said clock pulse generating and synchronizing means for generating carrier signals having predetermined phase relationships to said clock pulses, and modulating means coupling said carrier signal generating means and said synchronizing means for phase shift modulating said carrier signals with said information pulses, said receiver comprising signal input means for receiving said carrier signals from said transmitter, carrier regenerating means coupled to said signal input means for producing in phase and out of phase carrier signals, demodulating means coupled to said signal input means and said carrier regenerating means for providing in phase and out of phase information signals having coinciding zero crossover points, regenerating means for providing clock pulses in response to the zero crossovers of said information signals thereby providing clock pulses synchronized with said transmitter clock pulses, and phase comparison means coupled to said carrier regenerating means and said clock pulse regenerating means for adjusting the phases of the output of said carrier regenerating means so that the regenerated carrier signals have the same predetermined phase relationships with said regenerated clock pulses as said transmitter carrier signals have with the clock pulses of the transmitter.

2. A system for transmitting information pulses as claimed in claim 1, wherein said carrier regenerating means comprises full wave rectifying means for producing signals having frequencies doubled that of said carrier signals, filters coupled to said rectifying means for passing frequencies having twice the value of the frequencies of said carrier signals, pulse generating means for producing pulses in response to said signals passing through zero and means coupled to said pulse generating means for dividing the frequencies of said signals in half thereby producing in phase and out of phase carrier signals at the frequency of the carrier signals transmitted to said receiver.

3. A system for transmitting information pulses as claimed in claim 1, wherein said transmitter further comprises filtering means coupled to said modulator.

4. A system for transmitting information pulses as claimed in claim 1, wherein said clock pulse regenerating means comprises, signal input means for receiving the carrier signals phase-shift modulated by said information pulses, filtering means coupled to said signal input means, means coupled to said filtering means for detecting zero crossovers of said information pulses, pulse generating means for producing clock pulses similar to the clock pulses of said transmitter, means for adding and subtracting means for dividing said generated pulses, phase discriminating means coupled to said dividing and detecting means to control the pulses produced by said pulse generating means in response to the zero crossovers detected by said detecting means, thereby producing clock pulses in synchronism with the clock pulses of said transmitter, and signal output means for receiving said clock pulses coupled between said dividing means and said pulse discriminating means.

* * * * *

PC-1050
(5/69)

UNITED STATES PATENT OFFICE
CERTIFICATE OF CORRECTION

Patent No. 3,818,344 Dated June 18, 1974

Inventor(s) DIRK MUILWIJK

It is certified that error appears in the above-identified patent and that said Letters Patent are hereby corrected as shown below:

Column 4, line 31, change "21" to --2--.

Signed and sealed this 8th day of October 1974.

(SEAL)
Attest:

McCOY M. GIBSON JR.
Attesting Officer

C. MARSHALL DANN
Commissioner of Patents